United States Patent

Bowling et al.

[11] 4,000,061
[45] Dec. 28, 1976

[54] PARTICULATE DRY PRODUCT LOADING APPARATUS

[75] Inventors: Thomas J. Bowling, Houston; Glenn W. Ferguson, Alvin, both of Tex.

[73] Assignee: Browning-Ferris Industries, Inc.

[22] Filed: Aug. 29, 1975

[21] Appl. No.: 608,983

[52] U.S. Cl. .............. 209/21; 209/240; 209/250; 141/44; 23/288 G

[51] Int. Cl.² ................ B07B 11/06

[58] Field of Search .......... 209/12, 19, 21, 250, 209/259, 30, 31, 240, 245; 141/1, 44; 208/152, 161; 23/288 C, 288 E, 288 G; 302/59; 193/7

[56] References Cited

UNITED STATES PATENTS

| | | | |
|---|---|---|---|
| 3,370,705 | 2/1968 | Orulke | 209/259 X |
| 3,384,420 | 5/1968 | Fiscus | 302/59 X |
| 3,392,491 | 7/1968 | Vogt | 209/240 X |
| 3,409,126 | 11/1968 | Kennedy | 209/12 |
| 3,438,681 | 4/1969 | Lunde | 302/59 X |

Primary Examiner—Robert Halper
Attorney, Agent, or Firm—Pravel, Wilson & Gambrell

[57] ABSTRACT

An enclosed particular dry product is conveyed through a conduit by a gaseous fluid formed by a vacuum blower. Metered hoppers feed the product into the conduit. A cyclone removes the product from the fluid and conveys the same to a separating screen. The desired size product is recovered and passed through a flexible sock to minimize breakage and loaded into a vessel. The undesired size is fluid conveyed to a recovery receptacle.

9 Claims, 2 Drawing Figures

PARTICULATE DRY PRODUCT LOADING APPARATUS

BACKGROUND OF THE INVENTION

This invention relates generally to the field of a particulate dry product loading apparatus and in particular to pelletized catalyst loading apparatus.

The loading of pelletized catalyst in a reactor vessel of a chemical process has previously been a time consuming operation due to the critical requirements of preventing contamination or poisoning of the catalyst or damaging or breaking the pellets. Either catalyst contamination or an undesired pellet size of catalyst can have significant adverse effects on the operation of the chemical process employing the particulate catalyst and may require additional changing of expensive catalyst. Since the effectiveness of the catalyst also decreases in time, it has been necessary to shut down the chemical process employing the catalyst for long periods of time to replace the pelletized catalyst for these reasons.

U.S. Pat. No. 3,562,998 discloses a method of loading pelletized catalyst to minimize breakage, but the operation is slow and does not sort the particulate catalyst as to desired pellet size immediately prior to loading. U.S. Pat. No. 3,653,526 discloses a portable elevator for effecting faster catalyst loading, but the disclosed apparatus may damage the pellets and does not sort the catalyst pellets immediately prior to loading.

A portable catalyst sorting or screening apparatus is disclosed in U.S. Pat. No. 3,409,126, but the desired size catalyst material is directed into bucket or drum containers for loading in the manner disclosed in the two above-identified patents. U.S. Pat. No. 3,662,886 discloses an enclosed separation apparatus for pelletized catalyst similar to that of U.S. Pat. No. 3,409,126, but catalyst loading is effected in the manner previously explained.

SUMMARY OF THE INVENTION

This invention relates generally to a new and improved apparatus for loading dry particulate material.

Specifically, the present invention relates to a new and improved enclosed pelletized catalyst continuous loading apparatus in which the catalyst is continuously classified according to size immediately prior to flowing into the reactor vessel. The remotely controlled automatic system continuously moves the catalyst pellets to the classifier in a manner to reduce risk of pellet breakage while recovering the pellets of undesired size along with the catalyst dust.

An object of the present invention is to provide new and improved particulate dry product loading apparatus.

DESCRIPTION OF THE PREFERRED EMBODIMENT

Figure 1:
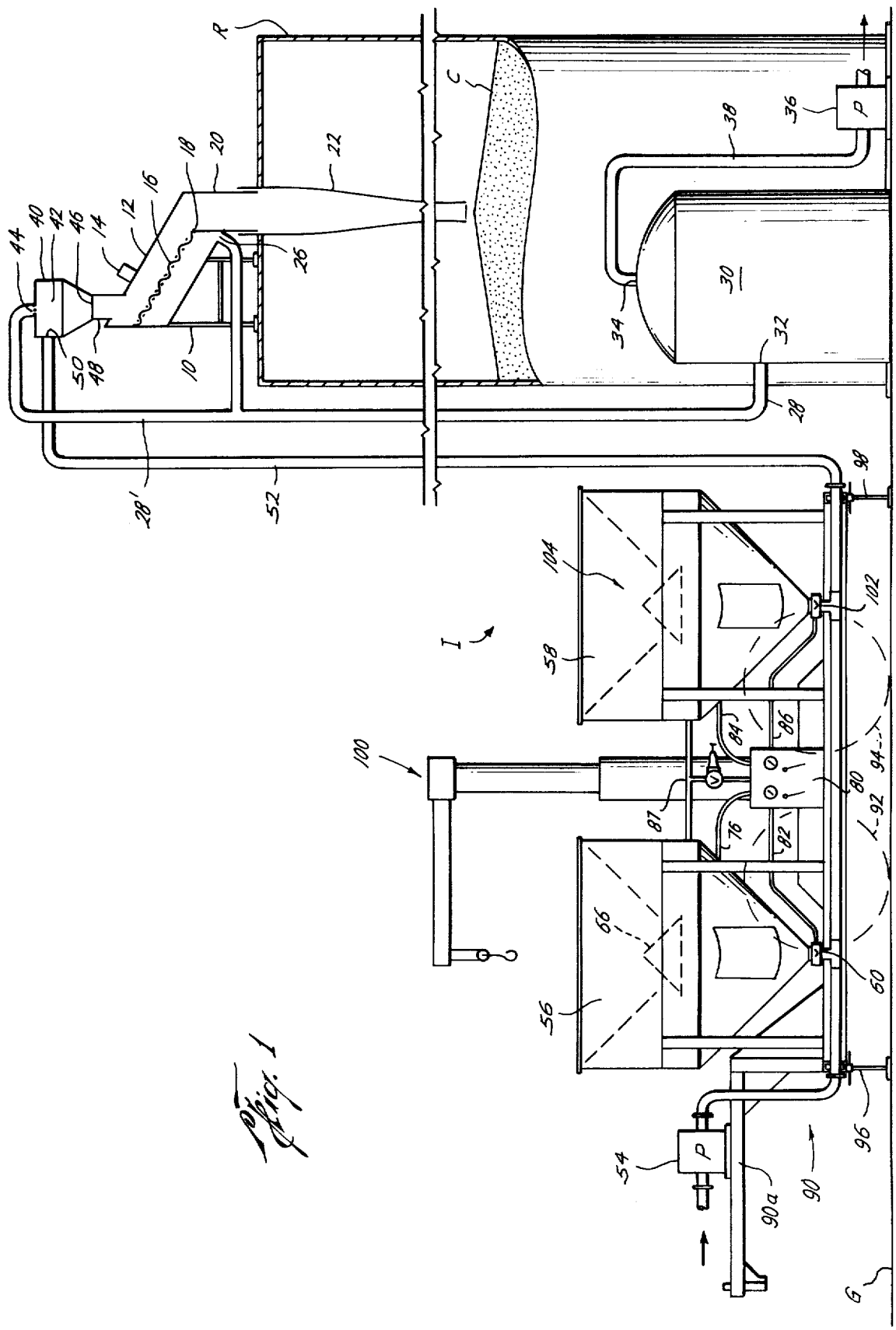
FIG. 1 is a schematic side view, partially in section, illustrating the loading apparatus of the present invention.

The particulate dry product loading apparatus of the present invention, generally designated 1, is schematically illustrated in FIG. 1. The loading apparatus I is preferably employed to load pelletized granular catalyst material C into a process or reactor vessel R supported by suitable means above the ground or earth surface G. The reactor vessel R may be of the type disclosed in U.S. Pat. No. 3,787,183, or may comprise a plurality of reactor tubes, such as illustrated in U.S. Pat. No. 3,562,998, to be filled with the catalyst material. The characteristics of the reactor R will be of course determined by the process conditions in which the catalyst C is employed, but the apparatus and method of the present invention is equally well suited to either type of reactor R.

The apparatus of the present invention I includes a support frame 10 removably resting upon the reactor R for supporting a screening housing 12 on the reactor R. The particular configuration of the support frame 10 will of course be dictated by the shape of the reactor vessel R and the screen housing 12 and the support frame 10 is preferably detachably mounted on the reactor vessel in order that the support frame 10 and the housing 12 may be removed from the reactor R when the loading of the catalyst C is completed.

The screen housing 12 may be of the type disclosed in U.S. Pat. No. 3,662,886 or U.S. Pat. No. 3,409,126, which may employ vibrator means 14 in conjunction with a separator screen 16 within the housing 12 for separating the pelletized catalyst material of undesired size for loading in the reactor vessel from pelletized catalyst material of desired size for loading in the reactor vessel. In the illustrated embodiment of FIG. 1, the catlyst C of desired size is larger that then openings through the screen means 16 for directing the catalyst C of the desired size through the loading or first discharge opening 18 of the housing 12. The first discharge opening 18 communicates with a discharge nozzle 20 of the housing 12 for directing the catalyst C of desired size to the reactor R.

Communicating with the catalyst discharge opening 20 secured thereto is a flexible conduit or sock 22 preferably made of woven material to form cushioning means for minimizing breakage of the desired size catalyst when moving into the reactor R from the outlet nozzle 20. The flexible sock 22 enables the catalyst to be placed at the desired location in the reactor R as is well known to those skilled in the art.

The screening housing 12 forms a second or undesired catalyst discharge opening 26 through which the catalyst of undesired size may pass from the housing 12. Recovery conduit means 28 communicate the housing discharge opening 26 with a recovery receptacle or receiver 30. The recovery receptacle 30 is preferably located remote from the reactor vessel R to minimize interference with the loading of the catalyst C and at ground level G for ease of handling during recovery.

The recovery receptacle includes an inlet opening 32 connected with the recovery conduit 28 and an outlet opening 34. Preferably, the outlet opening 34 is connected to a blowwer 36 by a suitable means such as conduit 38. The blower 36 serves as a vacuum pump means for forming a flow of gaseous carrier fluids, normally air, from the screening housing 12 through the recovery receptacle 30 for carrying entrained catalyst to the recovery receptacle 30. By locating the outlet opening 34 of the recovery receptacle 30 at the upper portion of the recovery receptacle the loss of catalyst fines and other catalyst through the vacuum blower 36 is minimized. The vacuum blower 36 further serves to prevent the escape of catalyst dust and other fines from the screen housing 12 which is preferably an enclosed system.

Disposed above the screen housing 12 is a cyclone housing 40 for removing catalyst pellets from suspension or entrainment in a flowing stream of gaseous fluid, normally air, communicated into the cyclone housing 40. The cyclone housing 40 forms a receiver 42 for slowing the flowing stream of carrier gaseous fluid and entrained catalyst to enable the catalyst to separate or remove the catalyst C from entrainment by the force of gravity as is well known. The cyclone 40 is preferably used for the tangential entrance of the entrained catalyst and flowing stream of fluid which imparts a centrifugal direction as the gaseous fluid is slowed which prevents the catalyst C from impinging on the cyclone shell 40 to minimize breakage or damage to the catalyst C. The cyclone shell 40, as is well known in the art, is provided with a first or overhead outlet 44 for the gaseous carrier fluid and a second or bottom outlet 46. The heavier catalyst C moves downwardly by the force of gravity within the cyclone shell 40 to flow through the outlet opening 46.

The outlet opening 46 of the cyclone shell 40 communicates with an inlet nozzle or opening 48 of the screening housing 12 and which is located to move the catalyst over the screen 16 for processing. With this arrangement the force of gravity extracts the catalyst from entrainment in the flowing stream of fluid communicated into the cyclone shell 42 downwardly to feed into the screening housing 12 as is well known in the art.

The overhead outlet 44 of the cyclone shell 40 communicates with the recovery receptacle 30 through recovery conduit mens 28' to recover any fines or catalyst C that may pass outwardly from the cyclone 40 through the overhead opening 44 with the carrier fluid. The cyclone 40 and screen housing 12 along with the recovery conduits 28 and 28' form an enclosed system communicating with the recovery receptacle 30 and which are normally operated at a pressure below atmospheric due to the operation of the vacuum blower 36. Such enclosed vacuum system prevents the escape of catalyst dust from the enclosed system.

The cyclone shell 40 is provided with a tangential inlet opening 50 as is well known to those skilled in the art and communicates with a loading inlet or feed conduit 52. The feed conduit 52 communicates with a blower 54 or other suitable means for forming a flowing stream of gaseous carrier fluid. Preferably, a relatively low super atmospheric air pressure blower 54 is installed, but if an inert gaseous fluid is employed the outlet of the vacuum blower 36 may be connected to the inlet of the blower 54 or a larger unit may be employed to recycle the inert gaseous fluid. One skilled in the art will recognize that such an enclosed recycling system could be employed utilizing air as a gaseous fluid.

Disposed above the feed conduit 52, at a location remote from the reactor R and preferably at ground level G are a plurality of gravity feed hoppers 56 and 58. The feed hoppers 56 and 58 are identical in construction and reference will be made to feed hopper 56 for description of the hopper and its operation, but it is to be understood that such description is equally applicable to feed hopper 58.

Figure 2:
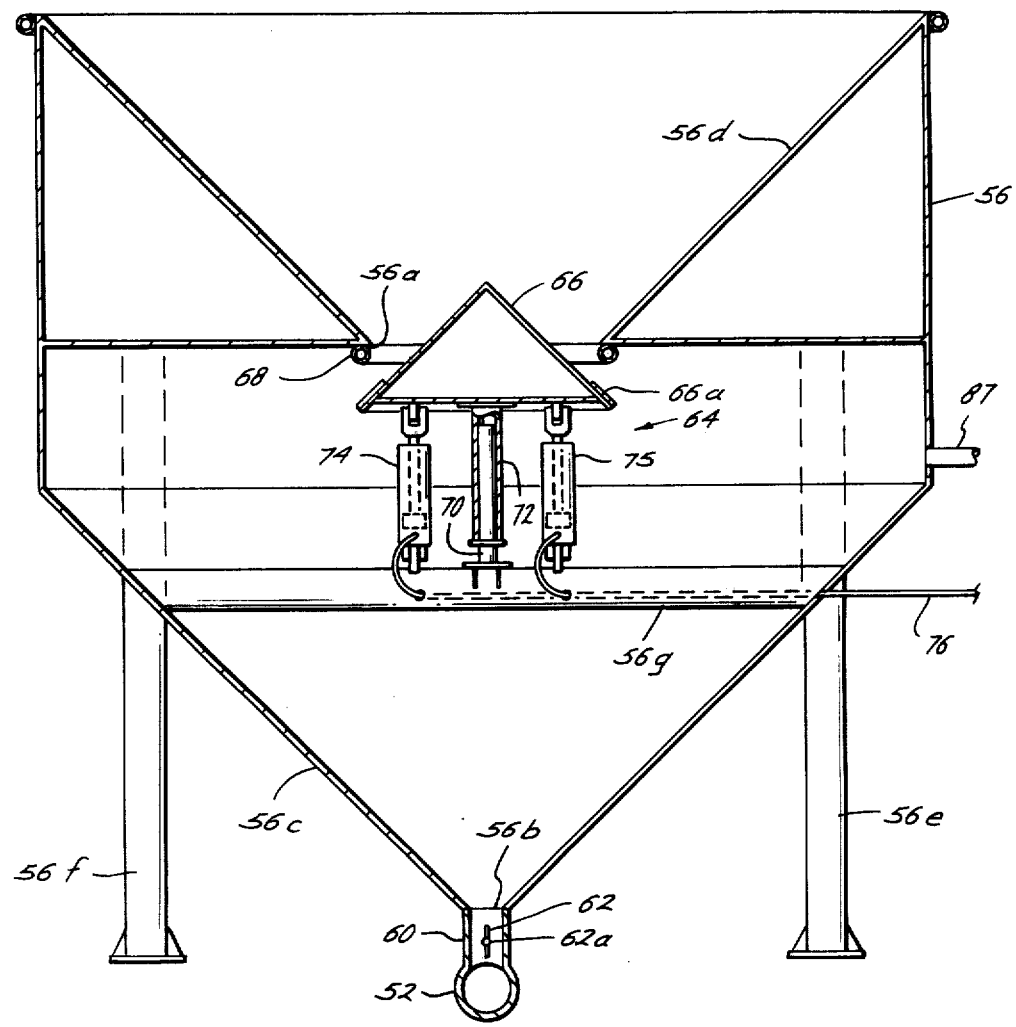
FIG. 2 is a side view, in section, of a loading hopper of the present invention.

As best illustrated in FIG. 2, the gravity feed hopper 56 includes an inlet or upper catalyst opening 56a and a lower or discharge outlet opening 56b. As is well known in the art, the gravity hopper is provided with a downwardly converging lower conical portion 56c for directing the catalyst C to move through the central outlet opening 56b. An upper downwardly converging conical portion 56d is provided for directing the catalyst C through the inlet opening 56a. Suitable support for the hopper 56 is provided by a plurality of support legs or members such as 56e and 56f.

Disposed between the outlet opening 56b and the feed conduit 52 is an outlet metering valve 60 for controlling gravity flow of the catalyst C from the hopper 56 into the conduit 52. The outlet metering valve 60 is preferably a remote controlled butterfly-type valve having central pivoting or rotating butterfly closure element 62 for minimizing breakage of the catalyst in flowing from the feed hopper 56 into the conduit 52 while enabling metering of the catalyst into the conduit 52 at a desired rate. As is well known to those skilled in the art, the pivot stem 62a is connected to a remote control opertor for effecting the desired operation of the valve 60.

Disposed adjacent the inlet opening 56a of the hopper 56 is an inlet valve means, generally designated 64 for controlling communication through the opening 56a. In the illustrated preferred embodiment, the inlet valve means 64 is mounted on a tubular support crossbar 56g of the hopper 56 between the conical feeding surfaces 56c and 56d.

The inlet valve means 64 includes a movable conical closure element 66 carrying an annular seating surface 66a which engages resilient tubular set ring 68 mounted with the hopper 56 about the central opening 56a. Engagement of the sealing surfaces 66a and 68 prevents movement of the catalyst C along the conical converging surface 56d through the opening 56 or communication from within the hopper 56 outwardly through the opening 56a and thus provides an enclosed loading system. The inlet valve apparatus 64 includes a pair of telescoping sleeves 70 and 72 for guiding reciprocating movement of the closure element 66 to and from the open position (FIG. 2) and the closed position with the seating surface 66a engaging the seating ring 68. One or more expansible chamber operating cylinders 74 and 75 connect the closure element 66 and the support 56g for providing the desired reciprocating operating movement of the closure element 66 as is well known in the art. Preferably, pneumatic operating cylinders 74 and 75 are utilized, but hydraulic operating cylinders or other mechanical operator apparatus known to those skilled in the art may be utilized. The operating cylinder 74 and 75 are connected in parallel with a control conduit 76 that is partially carried within the tubular support member 56g to protect the conduit 76 from the catalyst C.

Control of the inlet valve 64 and the outlet valve 60 of the hopper 56 is maintained from a remote control panel 80 which is preferably provided with a supply of air under pressure. By applying pressure through the conduit 76 the upper or inlet valve 66 of the hopper 56 will be closed while the control tubing 82 connected with the lower or outlet valve 60 will control its operation from the panel 80. Interlock means, known to those of ordinary skill in the art, may be provided at the remote control panel 80 to insure that the upper or inlet valve 66 is in the closed position before the outlet valve 60 may move to the open position. Alternately, or in addition to, interlock means may be provided for insuring that the lower outlet valve 60 is closed before the upper or inlet valve 66 may move to the open position. The corresponding valves on the feed hopper 58 are also controlled from the control panel 80 in the same or similar manner using control tubings 84 and 86.

To assure steady and continuous metering of the catalyst C into feed conduit 52, the hoppers 56 and 58 are pressurized to approximately the same pressure as the output of the blower 54. The means for effecting such hopper pressurization may include a separate discharge line from the blower 54 with suitable valving or may comprise a continuous pressure regulated supply from an outside source through branched conduit 89 communicating with the hoppers 56 and 58. The elimination of the initial pressure differential between the hoppers 56 and 58 and the feed conduit 52 also enables faster loading.

Preferably, the feed hoppers 56 and 58 as well as the remote control operating panel 80 are mounted on a trailer, generally designated 90, to increase the portability of the loading apparatus and provide a self-contained unit. The trailer 90 is provided with one or more sets of wheels 92 nd 94 as well as leveling jacks 96 and 98 for supporting the trailer 90 when the feed hoppers 56 and 58 are in use. In addition, the feed blower 54 is also mounted on the trailer 90 and preferably over the goose neck type towing tongue 98.

The trailer 90 may also mount crane apparatus, generally designated 100, for elevating drums or other containers of catalyst C above the hoppers 56 and 58 for dumping the catalyst contents of the various containers or drums into the feed hoppers 56 and 58. The crane apparatus 100 may be of any well known type, but is preferably provided with a retracting feature to provide lower clearance during road transportation of the trailer 90 in the usual manner.

OPERATION OF THE PRESENT INVENTION

In the use and operation of the present invention, the apparatus I is moved to the vicinity of the reactor vessel R to be loaded. The screen housing 12 and the cyclone 42 are then positioned on the reactor vessel R and supported in that position using the frame 10. The loading conduits 52 and recovery conduit 28 are then connected in the manner previously disclosed and schematically illustrated in FIG. 1.

When it is desired to commence loading, containers or drums of catalyst C are lifted by the crane means 100 and dumped in the hopper bins 56 and 58. After the initial filling of one or both of the hoppers 56 or 58, the blowers 54 and 36 are started to effect the flowing stream of carrier air through the conduits 52 and 28 and the vibrator 14 is turned on. In addition, the hoppers 56 and 58 are pressurized to enhance metering of increase the speed of catalyst discharge into the conduit 52. The discharge valve 60 is then opened the desired amount for metering the flow of catalyst C from the hopper 56 into the flowing carrier stream in the conduit 52. Prior to opening the valve 60 it is preferable that the inlet valve 66 be moved to the closed position to assure a totally enclosed loading apparatus. When the contents of the hopper 56 are emptied, the valve 60 is closed and the corresponding outlet metering valve 102 of the feed hopper 58 is open after the inlet valve means 104 of the hopper 58 is moved to the closed position. With the hopper 58 feeding into the conduit 52 the inlet valve 66 of the feed hopper 56 is moved to the open position to enable loading of catalyst C into the hopper 56. When the hopper 58 is emptied, the valve 102 is closed and the valve 60 is opened to enable feeding of the catalyst into the conduit 52 from the hopper 56. By alternating use of the feed hoppers 56 and 58, a substantially continuous feeding flow through the feed conduit 52 to the cyclone 40 and the screen housing 12 is provided and which enables very rapid loading of the reactor R while assuring an enclosed system. The discharge valve 60 is preferably provided with a reference signet as is well known in order that it will return to the desired metering position each time the valve 60 is actuated.

When the entrained pelletized or granular catalyst enters the cyclone 40 the catalyst moves downwardly by the force of gravity through the outlet opening 46 into the screen housing 12 where it moves across the screen 16 for separting the catalyst of desired size from catalyst of an undesired size. The catalyst of desired size passes from the screen housing 12 through the outlet nozzle 20 and the sock 22 into the reactor R. The catalyst of undesired size passes from the screen housing into the recovery conduit 28 and on into the recovery receptacle 30 as well as the catalyst dust, chips and fines going overhead in the cyclone 40. It will be understood that other known catalyst recovery equipment may be employed with equal results.

From the foregoing description, it is apparent that there is a dry particulate handling system disclosed herein which provides for rapid loading in an enclosed system to eliminate dust or escape of expensive catalyst. Furthermore, the screening of the catalyst C is effected immediately prior to loading and after handling and transportation of the catalyst to the elevated position for loading to minimize the loading of catalyst of undesired size.

The foregoing disclosure and description of the invention are illustrative and explanatory thereof, and various changes in the size, shape and materials as well as in the details of the illustrated construction may be made without departing from the spirit of the invention.

We claim:
1. Apparatus for loading flowable pelletized granular catalyst material into a reactor vessel having an opening for loading, including:
 a support frame for removably resting on the reactor vessel;
 screening means mounted with said support frame for screening the pelletized catalyst material to separate the pelletized catalyst material of undesired size for loading in the reactor vessel from the pelletized catalyst material of desired size for loading in the reactor vessel;
 means arranged with said screening means for directing the separated pelletized catalyst material of desired size from said screening means into the reactor vessel wherein the catalyst is loaded;
 means for substantially continuous conveying the pelletized catalyst material to said screening means for screening from a location remote from the reactor vessel;
 cyclone means disposed adjacent said screening means for removing pelletized catalyst material from entrainment in a flowing stream of gaseous fluid communicated to said cyclone means;

blower means at a location remote from said cyclone means for forming a flowing stream of gaseous fluid;

conduit means communicating with said cyclone means and said blower means for providing an enclosed flow path for the stream of gaseous fluid from said blower means into said cyclone means;

feeding means communicating with said conduit means between said cyclone means and said blower means for feeding the pelletized catalyst material into the flowing stream of gaseous fluid to entrain the pelletized catalyst material for movement with the flowing stream of gaseous fluid wherein the flowing stream of gaseous fluid conveys the pelletized catalyst material into the cyclone means;

said cyclone means forming a receiver having a first outlet and a second outlet, said receiver arranged for slowing the flowing stream of gaseous fluid and entrained pelletized catalyst material to enable gravity to remove the pelletized catalyst material from entrainment from he gaseous fluid with the gaseous fluid exiting through said first outlet;

said second outlet communicating with said screening means to enable movement of the pelletized catalyst material from said cyclone means into said screening means;

said screening means forming a screening housing having an inlet opening communicating with said second outlet of said cyclone means receiver;

said screening housing having a first discharge opening and a second discharge opening, said first discharge opening communicating with said means for directing the separated pelletized catalyst material of the desired size into the reactor vessel;

recovery receptacle means located remote from the reactor vessel for collecting the pelletized catalyst material of undesired size; and recovery conduit means communicating said recovery receptacle means with said second discharge opening of said screening housing for forming a flow path for the pelletized catalyst of undesired size from said screening housing into said recovery receptacle means.

2. The apparatus as set forth in claim 1, including:
said recovery receptacle means having an inlet opening connected with said recovery conduit means and an outlet opening; and
vacuum means communicating with said outlet opening of said recovery receptacle means for forming a flow of entrained pelletized catalyst material from said screening housing into said recovery receptacle means.

3. The apparatus as set forth in claim 2, including:
said recovery conduit means also communicating with said first outlet of said cyclone means to form an enclosed loading apparatus for preventing the loss of pelletized catalyst material of undesired size.

4. The apparatus as set forth in claim 1, including:
cushioning means communicating with said means for directing the separated pelletized catalyst material of the desired size into the reactor vessel for minimizing breakage of the desired size pelletized catalyst material after screening.

5. The apparatus as set forth in claim 1, wherein said feeding means includes:
a plurality of gravity feed hoppers disposed above said conduit means, each of said hoppers having an inlet opening and an outlet opening; and
each of said outlet openings having outlet metering valve means disposed between said feed hoppers and said conduit means therein for controlling gravity flow of the pelletized catalyst material from said hopper means into said conduit means.

6. The apparatus as set forth in claim 5, including:
each of said inlet openings having inlet valve means disposed therein for controlling gravity flow of the pelletized catalyst material into said hopper means.

7. The apparatus as set forth in claim 5, wherein:
said plurality of gravity feed hoppers are trailer mounted.

8. The apparatus as set forth in claim 5, wherein:
each of said outlet metering valve means is a butterfly-type valve.

9. The apparatus as set forth in claim 1, wherein:
said loading means is trailer mounted.

* * * * *